Nov. 10, 1925.
C. ANDERSON
ROLLING PIN
Filed Nov. 28, 1924
1,561,203
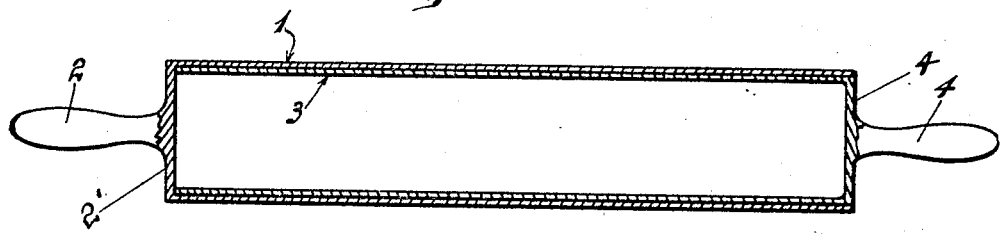
Fig. 1.
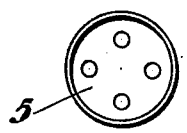
Fig. 2.
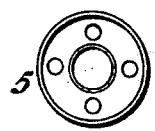
Fig. 3.
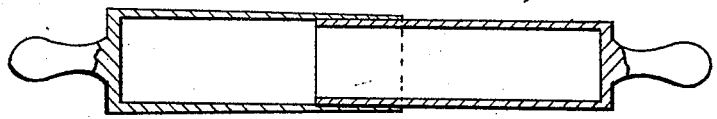
Fig. 5.
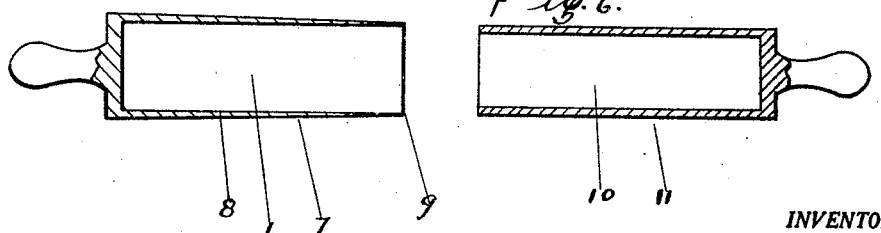
Fig. 6.
INVENTOR.
CLARA ANDERSON.
BY
ATTORNEYS.

Patented Nov. 10, 1925.

1,561,203

UNITED STATES PATENT OFFICE.

CLARA ANDERSON, OF HAYWARD, CALIFORNIA.

ROLLING PIN.

Application filed November 28, 1924. Serial No. 752,589.

*To all whom it may concern:*

Be it known that CLARA ANDERSON, a citizen of the United States, residing at Hayward, in the county of Alameda and State of California, has invented certain new and useful Improvements in Rolling Pins, of which the following is a specification.

My invention is an improvement in rolling pins and is of the type having a tubular body. The object of my invention is to provide a hollow rolling pin in which the handle are each rigidly secured to a long sleeve, one telescoping within the other, and extending the entire length thereof. The sleeves may be thus drawn out and extend or widen the surface for rolling dough. The body of the pin may be used for a housing or container for various small utensils such as different shaped dough cutters or the like.

As the sleeves are long, one extending the full length of the other, a long bearing surface is formed so that the handles do not wobble in use. My rolling pin may be made of sheet metal of equal section throughout or they may be made of thicker metal turned to proper diameter to give a close fit. The outer section may be slightly tapered on its periphery so that its outer conical surface and its inside cylindrical surface form a relatively sharp angle or edge. By this latter construction, when the sections are extended that is when they are drawn out and not completely telescoped, the pin does not leave a pronounced mark on the dough with one part rolled thinner than the adjacent part.

My invention will be more readily understood from the following specification and drawings in which:—

Figure 1 is a longitudinal section of my rolling pin showing its tubular construction and with the two sections completely telescoped.

Figure 2 is a plan of a dough forming cutter adapted to fit inside the hollow rolling pin.

Figure 3 is a plan of another form of cutter.

Figure 4 is a perspective view of still another form of cutter.

Figure 5 is a longitudinal section of my rolling pin showing the two sections partly drawn out or extended and illustrating the outer section slightly tapered and forming a modification of Figure 1.

Figure 6 is a longitudinal section of the two sections of the pin completely withdrawn and separated one from the other.

In the construction shown in Figure 1 the numeral 1 indicates the outer section of my tubular telescoping rolling pin and has a handle 2 secured to or made integral with the end 2'. The inner section 3 of the pin is constructed to have a close sliding fit inside the outer section 1 and has a handle similar to the handle 2 and designated by the numeral 4. This is secured to or made integral with the end 4'. In the construction shown in Figure 1 the sections are preferably made of sheet metal.

In Figures 2, 3 and 4 the various shapes of cutters are indicated by the numeral 5.

In Figures 5 and 6 the outer section 6 is slightly tapered on the outside 7 while the inside 8 is cylindrical and hence has a somewhat thin edge 9. The inner section 10 is formed cylindrical on its outer surface 11, to have a close sliding fit with the inner surface 8 of the outer section 6, and the inner surface may be cylindrical or not as desired. Handles are secured to the ends of each section in the same manner as specified for Figure 1.

With the construction above described the sections may be drawn out or extended and used to roll dough over a wide surface and as the outer tapered surface 7 of the section 6 and the outer surface 11 of the section 10 meet at a thin edge they do not make a material mark on the dough. Should there be an objectionable mark on the dough caused by using the pin extended it may be rolled down by telescoping the sections and using them as shown in Figure 1.

When it is desired to house the utensils shown in Figures 1, 2 and 3 or other articles in the hollow pin the sections are separated as shown in Figure 6, the articles placed therein and the sections telescoped together.

If it is desired to use my telescoping rolling pin, without the housing feature for utensils, the inner section may be made solid and preferably of wood to slide in a metallic outer section. My invention may be further modified without departing from the spirit thereof.

Having described my invention what I claim is:—

1. A hollow rolling pin comprising two sections of which the outer section is hollow and has a tapered outer surface and the inner section has a cylindrical outer surface to slide in the cylindrical inner surface of the outer section.

2. A hollow rolling pin comprising a hollow outer section tapered on its outer surface, an end integral therewith, a handle on the end, a hollow inner section having a cylindrical outer surface to have a close sliding fit in the cylindrical inner surface of the outer section, an end integral with the inner section and a handle on the end.

In testimony whereof I affix my signature.

CLARA ANDERSON.